May 8, 1962 W. J. TITLEY 3,032,779
PLAY PEN OR CRIB ACCESSORY FOR AUTOMOBILES
Filed Aug. 3, 1959 2 Sheets-Sheet 2

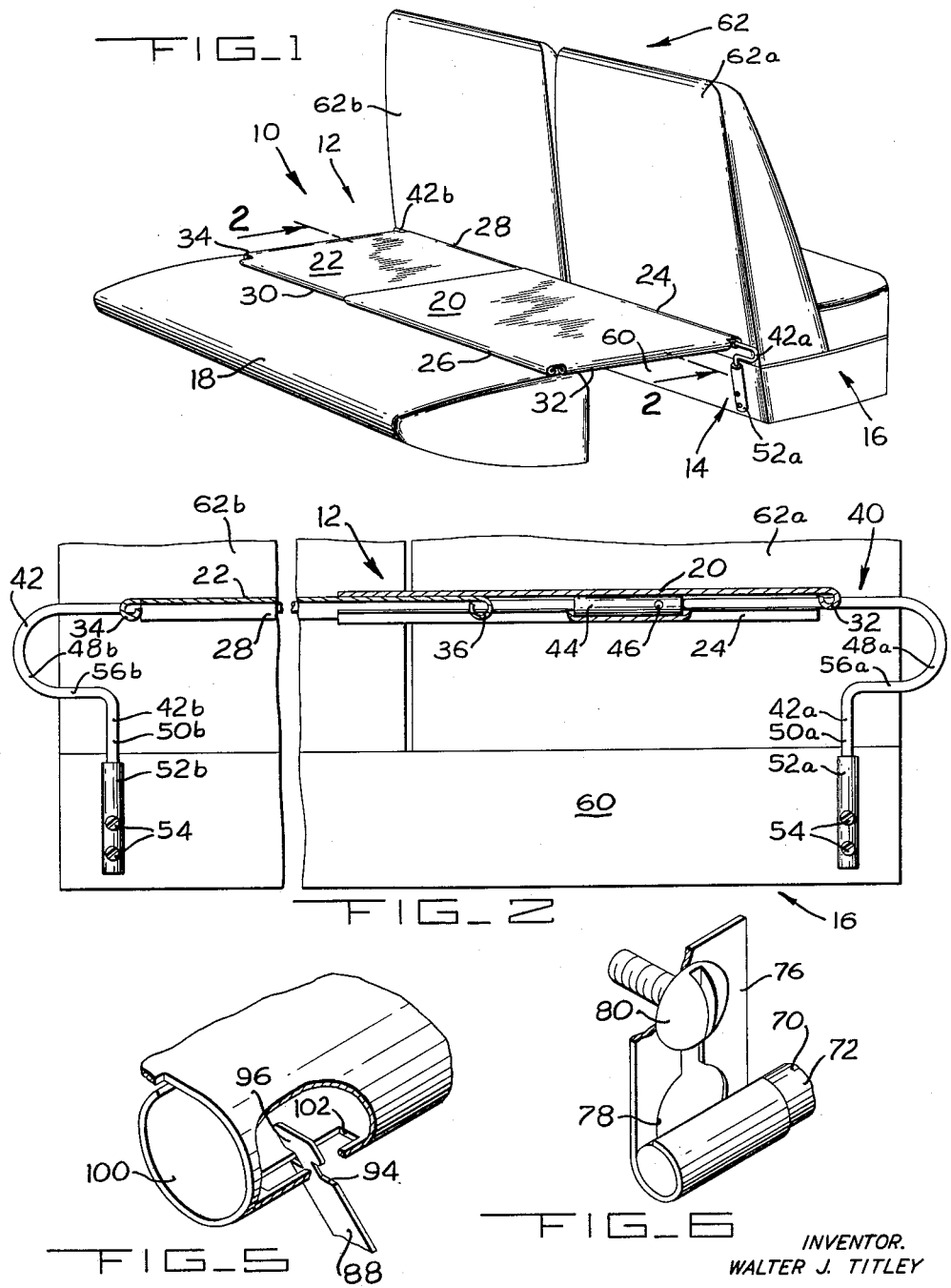

INVENTOR.
WALTER J. TITLEY
BY
ATTORNEY

United States Patent Office 3,032,779
Patented May 8, 1962

3,032,779
PLAY PEN OR CRIB ACCESSORY FOR AUTOMOBILES
Walter J. Titley, P.O. Box 888, Santa Monica, Calif.
Filed Aug. 3, 1959, Ser. No. 831,155
4 Claims. (Cl. 5—94)

This invention relates to automobile accessories, and more particularly to equipment for converting the after compartment of an automobile into a play pen or sleeping accommodation for a child.

An object of the invention is to provide an improved and simplified apparatus for converting the after compartment of an automobile having front and rear seats into an enclosure within which one or more children can safely play or sleep either while the vehicle is stationary or while it is traveling.

Another object is to provide a platform and support arrangement therefor whereby the after compartment of an automobile can quickly and easily, and without disfiguring any part of the automobile, be converted to a child's play pen or bed.

Another object is to provide a platform of the character indicated which is collapsible so that it occupies only approximately one-half of the automobile's after compartment, leaving the other half for the use of one or more passengers in a normal sitting position.

Another object is to provide a platform and a support arrangement therefor that can optionally serve as a play pen or sleeping space for one or more children, as above indicated, or can be raised and mounted in an elevated position enabling it to be used as a table or desk conveniently accessible to one or more passengers seated on the rear seat of the automobile.

Another object is to provide an apparatus for converting the rear compartment of an automobile into a child's play pen or bed, which is adapted for conversion into a writing desk, work table, drafting table, or a typewriter support for a person seated on the rear seat of the automobile, and which can be removed from the automobile when occasion requires, leaving the entire rear compartment unencumbered for normal use by the usual number of passengers.

Another object is to provide an accessory for use in the rear compartment of an automobile for converting the same into a child's play pen or bed, comprised of a platform adapted to be supported at its after edge by resting upon the front edge of the rear seat and at its front edge by a support structure mounted upon the back of the front seat assembly, which support structure is entirely below the level of, and is concealed and protected by the panel, thus leaving the entire upper surface of the platform unencumbered and thus free of protruding parts apt to injure a child or to detract from the freedom of his movements on the platform.

Another object is to provide a support structure for the front edge of the platform that leaves the upper surface of the same unencumbered, as indicated above, which is attachable quickly, easily, and without the use of tools, in a manner that does not interfere with tipping the back or backs of the front seat forward as is customary in two-door, five passenger automobiles to permit entry and departure of persons using the rear seat of such an automobile.

Another object is to provide an automobile accessory of the character indicated which is an improvement over that forming the subject mater of my prior Patent No. 2,503,602, issued April 11, 1950.

The invention possesses other objects and advantages, some of which, with the foregoing, will be set forth and explained in the following description of two embodiments of the invention which are illustrated in the drawings accompanying and forming part of this specification.

It is to be understood that I do not limit myself to the showing made by the said drawings and description, as I may likewise enjoy exclusive ownership of variations of the said embodiments within the scope of my invention as defined in the subjoined claims.

Referring to the drawings:

FIGURE 1 is a perspective of one form of the converting platform of the invention, showing the manner of its mounting upon the rear seat and the front seat assembly of an automobile.

FIGURE 2 is a vertical section along lines 2—2 of FIG. 1.

FIGURE 5 is an enlarged perspective showing the manner engaging the rear edge supporting braces of FIG. 4 to the platform.

FIGURE 6 is an enlarged perspective showing the arrangement for supporting the forward edge of the platform in either of the positions illustrated in FIGS. 3 and 4.

Figure 3:
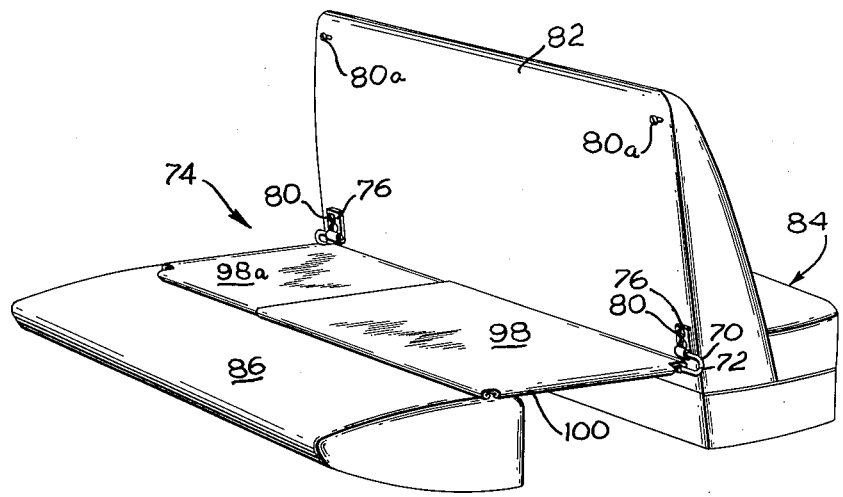
FIGURE 3 is a view similar to FIG. 1, showing a modified form of support for the edge of the platform.

FIGURE 1 of the drawings illustrates a preferred form of the accessory, indicated at 10, mounted in an automobile of the sedan or coupe type in a manner converting the rear compartment of the vehicle into a play pen or crib for the accommodation of one or more children either while the car is parked or while it is under way. The accessory 10 is in the form of a platform 12 and mounting means 14 for supporting the forward edge of the platform 12 upon the back of the front seat assembly 16. The after edge of the platform is supported by resting upon the upper surface of the rear seat 18 adjacent the forward edge thereof so as to leave the major portion of the rear seat 18 exposed so as to constitute, in effect, a continuation of the upper surface of the platform to co-operate therewith in presenting an area of ample proportions and suitable characteristics to be used as a play area or bed for children.

The platform 12 is a two-part structure comprising an upper panel 20 and a lower panel 22 each of which is provided with a strengthening downward curl at each of its front and rear edges. The forward and rear curls 24 (FIG. 2) and 26 (FIG. 1), respectively, of the upper panel 20 are slightly larger than, and extend in sliding embracing relation part way around, the forward and rear curls 28 (FIG. 2) and 30 (FIG. 1), respectively, of the lower panel 22, so that the two panels 20 and 22 are slidably interengaged in telescopic arrangement. This permits the platform 12 to be used optionally in an arrangement wherein it extends substantially the full width of the automobile's rear compartment, or in an arrangement wherein it occupies only approximately one-half of the compartment so that the other half can be used to accommodate one or more passengers seated comfortably and normally upon the half of the rear seat left exposed as a consequence of telescoping the platform to its half-width arrangement.

Both panels 20 and 22 are likewise provided with strengthening flanges 32 (FIGS. 1 and 2) and 34 (FIG. 2), respectively, at their outboard side edges, and the inboard lateral edge of the lower panel 22 is provided with a strengthening flange or curl 36 (FIG. 2).

The front edge mounting means 14 comprises a bracket 40 in the form of an elongate rod 42, best shown in FIG. 2, composed of two parts, 42a and 42b releasably interconnected by a telescopic joint provided by a suitable length of tubing 44 secured, as by a rivet 46, to one part which is seated therein to a depth corresponding to approximately one-half the length of the tubing, leaving the other half for the removable reception of the end of the other part of the rod 42. This arrangement interconnects the two rod parts 42a and 42b with sufficient strength to provide the requisite support for the forward edge of the platform 12, and yet permits release of the two parts 42a and 42b of the rod 42 from each other so that they can be inserted into the tube-like structure provided by the telescoped curls 24 and 28 at the forward edges of the panels 20 and 22, respectively, in spite of the fact that the rod parts 42a and 42b are formed with 180° reverse bends 48a and 48b, respectively, adjacent their outboard ends.

Beyond each reverse bend 48a and 48b, the end portions of the rod 42 are bent so that their end portions project straight downward, thus forming pin sections 50a and 50b removably receivable in sockets 52a and 52b, respectively, that are rigidly mounted in any suitable manner, e.g., by machine screws 54, upon a substantially vertical rear surface of the front seat assembly 16 of the automobile.

Between the lower end of each reverse bend 48a, 48b and the respective pin section 52a and 52b, a short straight section 56a, 56b is provided. Because of this, the sockets 52a and 52b are mounted in positions spaced apart a distance less than the overall length of the platform 12 when the sections 20 and 22 thereof are in their most fully extended arrangement, with the outboard ends of their forward curls 24 and 28 accommodated within the reverse bends 48a and 48b, respectively. Thus, when the parts are assembled with the platform 12 fully extended, the sockets 52a and 52b and all the other parts of the front edge mounting except the bends 48a and 48b are completely underneath the platform where they are concealed from view and where a child playing on the platform cannot be scratched or bruised by them.

Another advantage deriving from the above described front edge mounting 14 is that since the points at which the supporting rod 40 is detachably connected to the front seat assembly 16 are at a considerably lower level than that at which the platform 12 should be supported, the sockets 54 are advantageously fastened to the apron 60 commonly provided below the lower, rear portion of the back 62 of the front seat. This feature is especially valuable in installations of the equipment in automobiles of the two-door, five passenger type, wherein the back 62 of the front seat is made up of two sections 62a and 62b either or both of which can be tipped forward to facilitate entrance to and departure from the rear seat compartment. Since the front edge mounting means 14 receives its support from the apron 60 and is entirely free of the pivoted seat backs 62a and 62b, normal use of the latter is not hampered by the accessory of the present invention.

Figure 4:
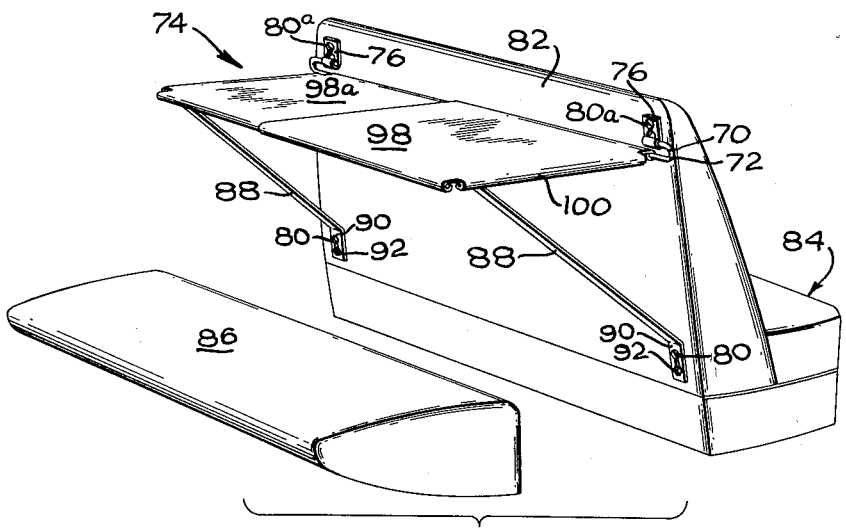
FIGURE 4 is a view similar to FIG. 3, showing the platform raised and mounted in an elevated position wherein it is available to passengers seated on the rear seat of the automobile for use as a desk or table.

However, the modified form of the device of this invention illustrated in FIGS. 4–6 possesses certain advantages in those installations where freedom of independent movement of separate front seat backs is unimportant. This form of the accessory is mounted at its forward edge upon a rod 70 consisting of two parts releasably interconnected by a tube (not shown) similar to the tube 44 above described and similarly secured to the inboard end of one part and adapted to releasably receive the inboard end of the other part. Each part of the rod 70 is formed with a reverse bend 72 at its end, but instead of turning downward as the previously described reverse bends 48a and 48b do, they turn upward to make engagement with supporting means above, rather than below, the plane of the platform 74.

A sheet metal clip 76 is rigidly secured to each end of the rod 72, for which purpose a short straight section of the rod is provided beyond each of the reverse bends 72, around which the lower end of the associated clip is tightly curled, as shown in FIG. 6, and soldered, welded, or otherwise secured as circumstances may dictate. A keyhole-shaped slot 78 is provided in the flat upper end portion of each clip 76 whereby it can be quickly and easily mounted upon and removed from a headed pin 80 rigid with and projecting from the back 82 of the front seat 84 of the automobile. One pair of such pins 80 are provided upon the seat back 82 at such elevation that when the two clips 76 are mounted thereupon, they support the front edge of the platform 74 at the same elevation as that of the forward edge of the rear seat 86, as shown in FIG. 3. In this arrangement, the accessory serves conveniently as a play pen or a crib for one or more children, as hereinabove described.

Since the two parts of platform 74 are telscopically interengaged, the platform can easily be shortened when supported in this manner, so that it occupies only about half the width of the rear seat compartment, so that one or more passengers can sit upon the rear seat while half the platform's full width is available for use as a crib or play area.

A second pair of horizontally aligned pins 80a are provided, similar to, but at a higher elevation than, the pins 80, and similarly spaced apart. This provides for the optional mounting of the platform 74 illustrated in FIG. 4, wherein the two clips are suspended from the upper pins 80a to support the forward edge of the platform 74, and the after part of the platform is supported by two braces 88.

Each brace 88 is formed with an angularly related flange 90 at its lower end and provided with a keyhole shaped slot 92 removably receivable upon one of the lower pins 80 in the place of one of the clips 76. Each brace 88 is provided with opposed square notches 94 adjacent its upper end, thus making the upper end 96 substantially T-shaped, as shown in FIG. 5.

The platform 74 is similar to the previously described platform 12, being formed of telescopically related sections 98 and 98a having curled edges as hereinabove explained. However, the curls 100 at the outboard edges of the sections of the platform 74 have a slot 102 (FIG. 5) formed in the substantially horizontal underside thereof. Each slot 102 is elongated longitudinally of the associated curl, permitting the T-shaped end 96 of one of the braces 88 and be inserted thereinto while the brace is turned so that its wider faces are parallel to the longer sides of the slot. When the end 96 has entered the curl 100 far enough for the notches 94 to register with the edges of the slot 102, the brace can be turned to dispose its wider faces perpendicular to the longer sides of the slot, as shown in FIG. 5, thus enabling the brace, in cooperation with its companion brace at the opposite end of the platform 74 to support the rear edge of the platform.

The braces, of course, should be of such length that with their upper ends engaged within the two slots 102 as described, and with the flanges 90 engaged upon the two lower pins 80, the rear edge of the platform 74 will be supported at the same level as that at which the front edge is disposed when the two clips 76 are engaged upon the two upper pins 80.

When so arranged, the platform 74 can be used by persons seated upon the rear seat 86 as a writing of typewriter desk, a drafting table, or as a picnic table.

Whereas two preferred embodiments of the invention have been illustrated and described, it is to be understood that further changes may be made in the detailed construction of the device without departure from the scope of the invention as defined by the claims.

The invention having thus been described, that for which protection is desired by Letters Patent is:

1. An accessory for an automobile having a front seat assembly and a rear seat, comprising a platform adapted to rest adjacent one edge on the back seat, and means for supporting the opposite edge of the platform upon the front seat assembly including an elongate rod attached to the platform adjacent said opposite edge thereof and projecting beyond both side edges of the platform, each projecting end of said rod having a reverse bend formed therein, attaching means secured to and projecting from the back of said front seat assembly, and means on each end of said rod beyond the associated reverse bend from the part of the rod that engages the platform engageable with said attaching means to support said rod and the forward part of the platform upon said attaching means.

2. An accessory for an automobile having a front seat assembly, comprising a platform and means for at least partly supporting the platform upon the front seat assembly including an elongate rod attached to the platform adjacent an edge thereof and projecting beyond both ends of said edge, reverse bends formed in the rod adjacent the end portions thereof, the end portions of the rod extending downward from said reverse bends, and socket members secured to the back of the front seat assembly in positions adapting them for the removable reception of said end portions of the rod, whereby said supporting means is disposed under the platform to leave the upper surface of the platform unencumbered.

3. An accessory for an automobile having front and rear seats, comprising a platform adapted to rest adjacent one edge on the back seat and means for supporting the opposite edge of the platform upon the front seat, including an elongate rod attached to the platform adjacent said opposite edge thereof and projecting beyond the ends of said opposite edge, each projecting end portion of the rod having a reverse bend formed therein, clips secured to said rod outwardly of said reverse bends, said clips having slots formed therein, and pins rigid with and projecting rearward from the back of said front seat and removably seated within said slots to support the rod and the forward part of the platform.

4. An accessory for an automobile having front and rear seats, comprising a platform adapted to rest adjacent one edge on the back seat and means for supporting the opposite edge of the platform upon the front seat including a downward curl formed in said platform along said opposite edge thereof, a rod engaged within said curl and projecting beyond the ends of said opposite edge, said rod being formed in two sections, a tube disposed within said curl with an end of each section of the rod engaged within the tube to hold the sections substantially in coaxial alignment, one of said sections of the rod being releasably seated within said tube whereby the rods and tube are removable from said curl, each of said rod sections projecting beyond the associated side edge of the platform and having a reverse bend therein, attaching means secured to and projecting from the back of said front seat, and means carried by the rod sections beyond said reverse bends thereof from the part of the rod that engages the platform engageable upon said attaching means to support said rod and the adjacent region of the platform.

References Cited in the file of this patent

UNITED STATES PATENTS

| | | |
|---|---|---|
| 1,517,429 | Jensvold | Dec. 2, 1924 |
| 1,596,689 | Silver | Aug. 17, 1926 |
| 2,174,140 | Schofield | Sept. 26, 1939 |
| 2,184,047 | King | Dec. 19, 1939 |
| 2,503,602 | Titley | Apr. 11, 1950 |
| 2,631,304 | Brockmeier | Mar. 17, 1953 |
| 2,886,831 | Duner | May 19, 1959 |